US008953759B2

(12) United States Patent
Dawson

(10) Patent No.: US 8,953,759 B2
(45) Date of Patent: *Feb. 10, 2015

(54) INTERJURISDICTIONAL RECORDING MECHANISM

(71) Applicant: VERIDICOM, SA DE CV, Fresno, CA (US)

(72) Inventor: William J. Dawson, Baja (MX)

(73) Assignee: VERIDICOM, SA de CV, Fresno, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/097,060

(22) Filed: Dec. 4, 2013

(65) Prior Publication Data
US 2014/0093055 A1 Apr. 3, 2014

Related U.S. Application Data

(63) Continuation of application No. 10/191,960, filed on Jul. 8, 2002, now Pat. No. 8,644,466.

(51) Int. Cl.
H04M 1/64 (2006.01)
H04M 1/656 (2006.01)
H04M 3/22 (2006.01)
H04M 3/42 (2006.01)
H04M 3/56 (2006.01)

(52) U.S. Cl.
CPC ............ H04M 1/656 (2013.01); H04M 3/2281 (2013.01); H04M 3/42221 (2013.01); H04M 3/56 (2013.01)
USPC .. 379/88.23; 379/85; 379/88.16; 379/202.01; 370/260; 455/416

(58) Field of Classification Search
USPC .......... 379/41, 51, 67.1, 68, 71, 88.16, 88.18, 379/88.23, 88.26, 93.21, 142.05, 142.07, 379/158, 202.01, 205.01, 220.01, 85; 370/260; 455/416
See application file for complete search history.

(56) References Cited

U.S. PATENT DOCUMENTS

| 4,481,382 A | 11/1984 | Villa-Real |
| 4,972,461 A | 11/1990 | Brown et al. |
| 5,467,390 A | 11/1995 | Brankley et al. |
| 5,544,231 A | 8/1996 | Cho |
| 5,794,207 A | 8/1998 | Walker et al. |
| 5,796,394 A | 8/1998 | Wicks et al. |
| 5,818,955 A | 10/1998 | Smithies et al. |
| 5,838,812 A | 11/1998 | Pare, Jr. et al. |

(Continued)

Primary Examiner — Md S Elahee
(74) Attorney, Agent, or Firm — Blakely Sokoloff Taylor & Zafman, LLP

(57) ABSTRACT

The present invention provides a system for recording an interaction including, a telephone call between a caller and a digital processing system placed over an interjurisdictional boundary, and may include a telephone call placed to at least one called recipient. For example, a caller may place a telephone call over an interjurisdictional boundary to a remote computer server. The server may use an interactive voice response (IVR) unit to obtain caller identification information, provide recording identification information to the caller, and receive authorization from the caller to record an interaction between the caller and a call recipient. The server can also obtain testamentary intent information. A telephone call may then be placed by the server to the recipient, and a two-party digital voice recording can be made on the remote server of a three-way telephone call, in which the server is one of the parties.

17 Claims, 3 Drawing Sheets

(56) References Cited

U.S. PATENT DOCUMENTS

| | | |
|---|---|---|
| 5,872,848 A | 2/1999 | Romney et al. |
| 5,923,746 A | 7/1999 | Baker et al. |
| 6,064,751 A | 5/2000 | Smithies et al. |
| 6,072,860 A | 6/2000 | Kek et al. |
| 6,085,322 A | 7/2000 | Romney et al. |
| 6,091,835 A | 7/2000 | Smithies et al. |
| 6,169,787 B1 | 1/2001 | Shimada et al. |
| 6,215,858 B1 | 4/2001 | Bartholomew et al. |
| 6,311,231 B1 | 10/2001 | Bateman et al. |
| 6,335,964 B1 | 1/2002 | Bowater et al. |
| 6,396,919 B1 | 5/2002 | Shimada et al. |
| 6,697,458 B1 | 2/2004 | Kunjibettu |
| 6,724,864 B1 * | 4/2004 | Denenberg et al. ........ 379/88.16 |
| 2001/0034684 A1 | 10/2001 | Cushing et al. |
| 2001/0034835 A1 | 10/2001 | Smith |
| 2002/0010587 A1 | 1/2002 | Pertrushin |
| 2002/0026577 A1 | 2/2002 | Futamura et al. |
| 2002/0029159 A1 | 3/2002 | Longden |
| 2007/0250716 A1 | 10/2007 | Brunk et al. |
| 2008/0222240 A1 | 9/2008 | Deryugin et al. |

\* cited by examiner

INTERJURISDICTIONAL RECORDING MECHANISM

CROSS-REFERENCE TO RELATED APPLICATION

This application is a continuation of pending U.S. patent application Ser. No. 10/191,960, filed Jul. 8, 2002, entitled, "INTERJURISDICTIONAL RECORDING MECHANISM", which issued as U.S. Pat. No. 8,644,466 on Feb. 4, 2014.

FIELD OF THE INVENTION

The invention relates to recording telephone conversations made over interjurisdictional boundaries. More specifically, the invention relates to recording a three-way telephone call including a connection to a digital processing system over an interjurisdictional boundary.

BACKGROUND

State laws vary as to whether it is legal for an individual who is party to a telephone conversation to record that conversation without informing the others of the recording. In some states, a party to such a conversation may freely record it, while in other states it is unlawful to record the conversation. However, according to current federal law, it is lawful for a party to a telephone conversation to record that conversation without the knowledge or consent of the other parties. Therefore, what is needed is a system that provides an easy and practical way to secretly record and access the recordings of telephone conversations in accordance with federal laws.

BRIEF DESCRIPTION OF THE DRAWINGS

The invention is illustrated by way of example and not by way of limitation in the figures of the accompanying drawings in which like references indicate similar elements. It should be noted that the references to "an" or "one" embodiment of this disclosure are not necessarily to the same embodiment, and such references mean at least one.

DETAILED DESCRIPTION

According to embodiments of the invention, an interaction is recorded, including a three-way telephone call having a telephone call between a caller and a digital processing system placed over an interjurisdictional boundary, and a telephone call placed to at least one called recipient. For example, according to an embodiment, a caller may place a telephone call over an interjurisdictional boundary to a remote computer server, which identifies the caller and receives authorization from the caller to record an interaction between the caller and a call recipient. The server may use an interactive voice response (IVR) unit to obtain caller identification information and provide recording identification information to the caller in response to the caller's authorization to record an interaction. A telephone call may then be placed by the server to the recipient, and a two-party digital voice recording can be made on the remote server of a three-way telephone call, in which the server is one of the parties. In addition, according to embodiments, the digital recording may only be accessed by authorized parties and is protected from being modified without permission. Thus, the term "network electronic surveillance for telephones" or "NEST" may be used to characterize a digital processing system or computer server providing the functionality described above.

Figure 1:
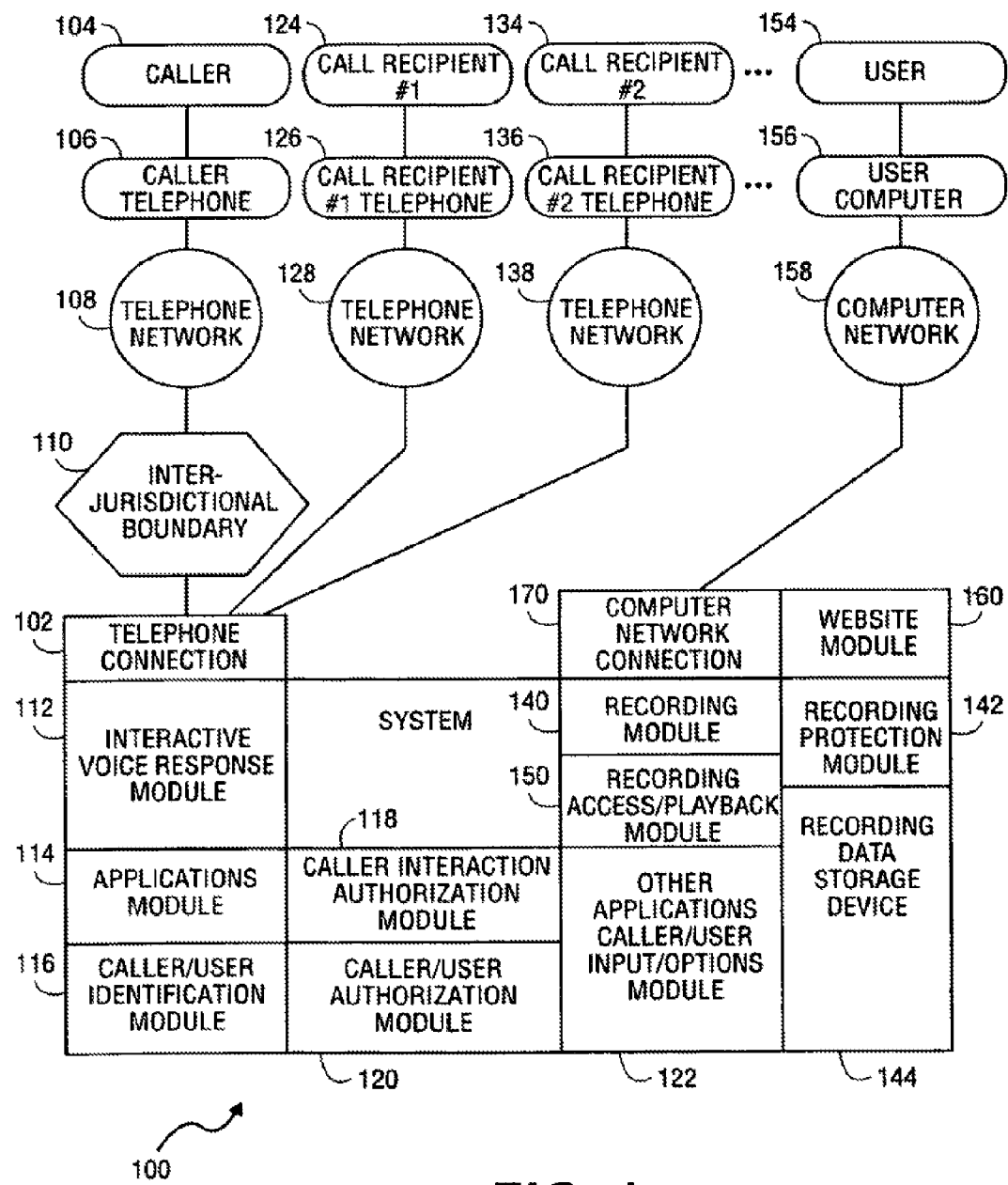
FIG. 1 is a block diagram of an interjurisdictional recording system, according to one embodiment of the invention.

Embodiments of an interjurisdictional recording system or mechanism (also referred to herein as "the system") include one or more machines having typical digital computing technology such as a digital processing system, computer network server (e.g., such as an Internet server like a Structured Query Language 2000 server), general purpose computer (e.g., as described below with respect to FIG. 2), personal computer (PC), or combination of any of the above. For example, FIG. 1 is a block diagram of an interjurisdictional recording system, according to one embodiment of the invention. The interjurisdictional recording system of FIG. 1, generally denoted by 100, includes telephone connection 102 and interactive voice response (IVR) module 112 for communicating with callers and call recipients. For instance, as shown in FIG. 1, telephone connection 102 may be used to communicate across one or more telephone networks with callers (e.g., caller 104 requesting to use the system) as well as call recipients (e.g., recipients 124 and 134) in order to record interactions between callers and call recipients. Thus, caller 104 may use caller telephone 106 to place a telephone call over telephone network 108 and over interjurisdictional boundary 110 to telephone connection 102.

Moreover, embodiments include telephone connections to one or more call recipients made over one or more telephone networks. These connections may or may not be connected over an interjurisdictional boundary, and may or may not be connected over the same telephone network used to connect the system with the caller. For example, as shown in FIG. 1, telephone connection 102 is connected to telephone network 128 which connects to call recipient #1 telephone 126 for interfacing with call recipient #1, depicted as 124, and provides for a "conference call" between the three parties. Telephone connection 102 may connect to additional call recipients as well. In addition, FIG. 1 shows telephone connection 102 connected to telephone network 138 which is connected to call recipient #2 telephone 136 for interfacing with call recipient #2, depicted as 134. According to embodiments of the invention, telephones used (e.g., 106, 124, and 134) may be any type of conventional verbal communication device including a Land line, cell phone, Public Switched Telephone Network (PSTN), Internet Protocol (IP) phone, or other device capable of accessing a telephone network and providing for interactive voice communication.

In addition, embodiments include various types of telephone interactions with the system. For instance, calls directed to the system may be answered by a computer server having an auto-attendant system or call manager that uses an interactive voice response system, tonal means, or other audio method for communicating with the caller. Thus, as shown in FIG. 1, interactive voice response module 112 may work in concert with telephone connection 102 to provide voice response dialog between caller 104 and system 100. Specifically, the system may include a call manager having a Gateway to the PSTN and use Cisco's IP IVR™ to communicate with callers.

Embodiments of the invention also include computer access to the system. For instance, a user may use a network client computer to access a computer network, which in turn accesses a computer network server interface, which is connected to the interjurisdictional recording system. Thus, in addition to telephone connections as shown in FIG. 1, computer network connection 170, to system 100, may provide an additional avenue for interfacing with the system. For example, user 154 at user computer 156 may access the system by connecting to computer network 158, and then connecting to computer network connection 170, which is coupled to system 100.

Embodiments of the user computer include various typical digital computing technologies, such as, a computer network client (e.g., such as an Internet linked computer having an Internet browser), a general purpose computer (e.g., as described below with respect to FIG. 2), a personal computer, or combination of any of the above. Moreover, embodiments of the system include appropriate server architecture and software to provide an Internet web site, through which the system can be accessed. Therefore, as shown in FIG. 1, system web site module 160 may include a computer server having a web server (e.g., such as a Nexus Server™ running Windows™ 2000 operating system and extensible markup language), a file transfer protocol server (e.g., to allow users to download copies of recordings), and a mail server (e.g., for sending a recording via e-mail to an e-mail address).

Interjurisdictional recording system 100 also includes applications module 114 for providing and controlling the various applications of the system. For instance, application module 114 would provide for and determine whether an application to record a conversation, access a recording, playback a recording, e-mail a recording, or provide help to a caller was requested (e.g., such as by applications module 114 initiating prompting of a caller or user). Application module 114 also ensures that the requested application is available, authorized, and that the proper inputs and/or options are entered for that application. Moreover, if a proper application is selected, available, authorized, and proper inputs and options are entered, applications module 114 will then execute the selected application.

Likewise, according to embodiments, the system may include the capability to prompt for, receive, and confirm caller or user personal identity information, authorization to perform a task. For instance, as shown in FIG. 1, system 100 may include caller/user identification module 116 for prompting for and receiving caller/user identification information. Embodiments also include the system returning recording identification information to a caller or user. Hence, if a caller or user's ID is confirmed and that person is authorized (e.g., see 120 below for details) to record an interaction, identification module 116 may return recording identification information to the caller or user.

Similarly, system 100 includes caller/user authorization module 120, which determines whether a caller or user is authorized by the system to perform or request a certain application, such as, recording an interaction or accessing a recording. Moreover, caller interaction authorization module 118 of system 100 provides for and keeps account of when the system is authorized by a caller to perform a certain interaction. Similar to module 120 above, interactions authorized by a caller include, but are not limited to, recording a telephone conversation, accessing a recording, playing back a recording, e-mailing a recording, providing one or more target identifiers corresponding to one or more call recipients, and receiving interaction account information such as credit card information and/or user account information.

Furthermore, system 100 includes recording module 140 for recording an interaction including a telephone call placed over an interjurisdictional boundary. Examples of such recordings are a three-way telephone call including a telephone call between a caller and a digital processing system placed over an interjurisdictional boundary, and a telephone call placed to one or more call recipients. Such recording may also include interaction with the system, such as communication between the caller and the system via interactive voice response module 112 and communication between one or more call recipients and interactive voice response module 112.

Furthermore, as shown in FIG. 1, system 100 includes recording access/playback module 150 for providing and controlling access to an playing back of recordings. Instances of access and playback of recordings include access and playback of recordings to callers and users who may access the system via methods other than the telephone connection, such as by computer network. Thus, according to embodiments, a caller or user having proper authorization may access, playback, copy, or transmit a copy (e.g., such as via e-mail to an e-mail address) of a recording. For instance, a "call flow" option will allow a caller to replay an audio file of a recording previously made by that caller.

According to one or more embodiments, interjurisdictional recording system 100 also includes other applications caller/user input/options module 122 for ensuring that the proper inputs and/or options are provided by a caller or user as necessary to execute various other applications of the system (e.g., applications in addition to recording and accessing recordings of interactions). For instance, other applications caller/user input/options module 122 may send a recorded conversation to a previously provided e-mail address, play a recording of the service terms and policies of the system, contact the system owner, and provide help to users/callers.

Embodiments of the interjurisdictional recording system include a system for protecting recordings from being modified, except by those with proper authorization. For instance, as shown in FIG. 1, interjurisdictional recording system 100 includes recording protection module 142 for protecting a recording from being modified by a caller, user, recipient, or other entity that does not have proper authorization. Correspondingly, recording data storage device 144 of system 100 allows for storage of recordings in digital media. According to embodiments, for example, two-party digital voice recordings or interactions may be stored and indexed in a database so that certain recordings may be selected out of a plurality of such recordings using identification information and other criteria, and accessed, played back, e-mailed, or copied. Embodiments of the invention also include dual storage of recordings in more than one location. Particularly, audio file storage may include storage in a File Server with a Raid system as well as in remote storage services. As such, the access/playback module is able to look for, locate, and load a recording file from any of the above storage devices.

Moreover, according to embodiments, recording and playback may be used in concert with recording a three-way call over an interjurisdictional boundary in order to create a digital record including audio questions, prompts, and playback from the system to the caller and recipient, as well as audio responses from the caller and recipient to the questions, prompts, and playback from the system. Such a recording can be made, stored, accessed, played back and used independently or in connection with other recorded interactions as discussed herein.

In addition to the architecture described above with respect to FIG. 1, embodiments of the invention include computer software embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves. For instance, an embodiment of the invention can be implemented as computer software in the form of computer readable code executed on a general purpose computer such as computer 200 illustrated in FIG. 2, or in the form of bytecode class files running on such a computer.

Figure 2:
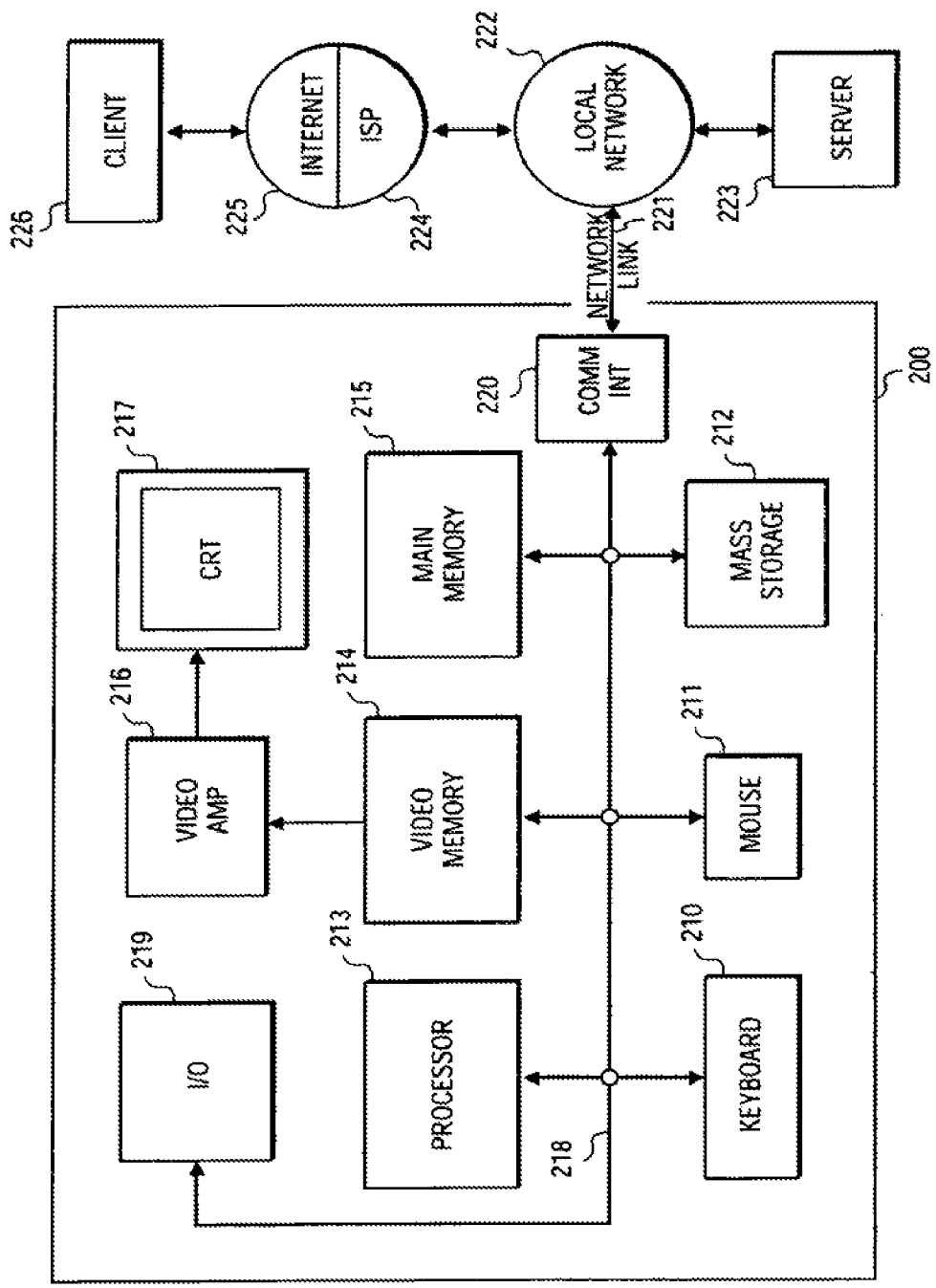
FIG. 2 is a block diagram showing a general computer system for use in association with the interjurisdictional recording system, according to one embodiment of the invention.

Moreover, according to embodiments, a general purpose computer such as computer 200 illustrated in FIG. 2 can be used to provide computer hardware for the system, such as a computer network server (e.g., computer 200 provides the functionality of interjurisdictional recording system 100). Similarly, according to embodiments, a general purpose computer such as computer 200 illustrated in FIG. 2 can be used to access the system, such as by a computer network client (e.g., computer 200 provides the functionality of user computer 156).

As shown in FIG. 2, computer 200 has keyboard 210, mouse 211, and processor 213 coupled to bi-directional system bus 218. Other suitable input devices may be used in addition to, or in place of, the mouse 211 and keyboard 210. I/O (input/output) unit 219 coupled to bi-directional system bus 218 represents such I/O elements as a printer, A/V (audio/video) I/O, etc.

Computer 200 includes a video memory 214, main memory 215 and mass storage 212, all coupled to bi-directional system bus 218 along with keyboard 210, mouse 211 and processor 213. The mass storage 212 may include both fixed and removable media, such as magnetic, optical or magnetic optical storage systems or any other available mass storage technology. Bus 218 may contain, multiplex data/address lines and/or separate data and address lines.

Processor 213 may include one or more of a microprocessor manufactured by Motorola, Intel, Sun Microsystems, and any other suitable microprocessor or microcomputer. Main memory 215 can include dynamic random access memory (DRAM). Video memory 214 can include a dual-ported video random access memory and can be coupled to video amplifier 216. The video accelerator or amplifier 216 can be used to drive a display suitable for displaying graphic images, such as by converting pixel data stored in video memory 214 to a raster signal suitable for use by monitor 217. Monitor 217 may be a cathode ray tube (CRT), LCD (Liquid Crystal Display), or TFT (Thin-Film Transistor).

Computer 200 may also include a communication interface 220 coupled to bus 218. Communication interface 220 provides a two-way data communication coupling via a network link 221, for instance, coupled to a local network 222. For example, if communication interface 220 is an integrated services digital network (ISDN) card or a modem, communication interface 220 provides a data communication connection to the corresponding type of telephone line, which comprises part of network link 221. If communication interface 220 is a local area network (LAN) card or Network Interface Card (NIC), communication interface 220 provides a data communication connection via network link 221 to a compatible LAN. Physical network links can include Ethernet, wireless, fiber optic, and cable television type links. Embodiments include communication interface 220 sending and receiving electrical, electromagnetic, infrared, or optical signals which carry digital data streams representing various types of information. For instance, communication interface 220 can be a telephone modem (e.g., 102) providing voice and data communication via a telephone network (e.g., such as 102 coupled to 128, 138, and 108 via 110).

Thus, according to embodiments, a general computer may be used to receive a telephone call over an interjurisdictional boundary and provide an interactive voice response (IVR) communication with the caller. Similarly, embodiments include a general computer placing a telephone call to a recipient and making a two-party digital voice recording of a three-way telephone call, in which the computer is one of the parties.

In addition, network link 221 may provide data communication through one or more networks to other data devices. For example, network link 221 may provide a connection through local network 222 to local server computer 223 or to data equipment operated by an Internet Service Provider (ISP) 224. ISP 224 in turn provides data communication services through the "Internet" 225. Local network 222 and Internet 225 both use electrical, electromagnetic or optical signals which carry digital data streams.

As shown in FIG. 2, computer 200 can send messages and receive data through the network(s), network link 221, and communication interface 220. Hence, in the Internet example, remote client computer 226 might transmit a requested code to enter a web site or access an application program through Internet 225, ISP 224, local network 222 and communication interface 220. In accordance embodiments, such application includes accessing an Internet web site for access, copy, play back, transmit, or obtain a copy of a recording of a two-party digital voice recording of a three-way telephone call. The computer systems described above are for purposes of example only. Embodiments of the invention may be implemented in any type of computer system or programming or processing environment, such as those described above with respect to FIG. 1.

Figure 3:
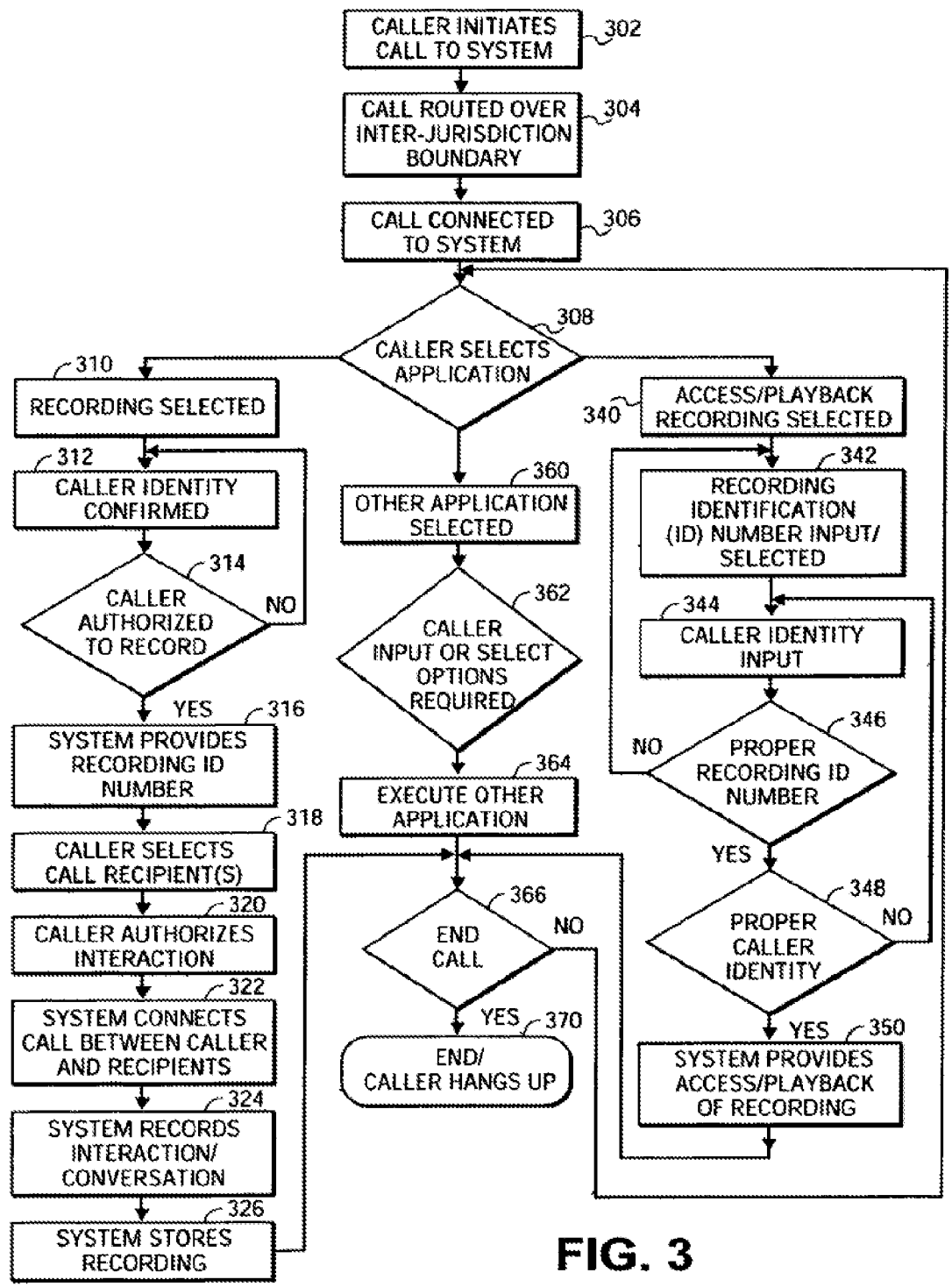
FIG. 3 is a flow diagram showing a process for using an interjurisdictional recording system, according to one embodiment of the invention.

FIG. 3 is a flow diagram showing processes for using an interjurisdictional recording system, according to one embodiment of the invention. As shown in FIG. 3, a caller initiates a call to the interjurisdictional recording system 302, such as by dialing an international, toll-free, local, or other telephone number from a phone or other device capable of accessing a telephone network. The call is routed over an interjurisdictional boundary, such as a United States state border, international border, or other legal jurisdictional boundary. According to embodiments, for example, the call may be routed over the interjurisdictional boundary due to the calling telephone being located in one jurisdiction and the called system corresponding to the number dialed by the caller being located in another jurisdiction. Also, according to embodiments, the call initiated by the caller may be redirected by a dedicated line or private line. Thus, for instance, a caller could initiate a telephone call by dialing a 900 number which is redirected from Fresno, Calif. to the system in Tijuana, Baja Calif. by a dedicated line. Thus, the call is connected to the system over an international interjurisdictional boundary. Referring to FIG. 3, the call is then connected to the system 306, such as by connection to a digital processing system.

According to embodiments, various types of call connections may be made to the system, such as via a call being answered by a computer server which plays an audio file with a welcome message to the caller, plays a voice menu to the caller, and waits for the caller to choose an option. As shown in FIG. 3, the system may run an IVR application and wait for the caller to select an application 308, such as by inputting using the dial pad of the caller's telephone or by speaking a number. More specifically, for instance, the system can play a menu voice file giving the following options: "dial or say 1 to record a conversation, dial or say 2 to play a recorded conversation, dial or say 3 to send the recorded conversation to a previously provided e-mail address, dial or say 4 to hear the service terms and policies, dial or say 5 to contact the system owner, dial or say 6 for systems help, dial or say 0 to repeat the menu options." In response, the user then selects an option by dialing or speaking a number, which the system detects. As a result, the caller may select an application to record a three-way telephone call between the caller, the system, and at least one call recipient.

Further, in accordance with embodiments, depending on the application that is selected, the system prompts the caller for different options or information, such as by using an IVR, tonal means, or other audio method. For instance, as shown in FIG. 3, if recording an interaction or conversation is selected 310, the system may respond by requesting to confirm the caller's identity 312. Thus, the system may prompt the caller to provide identity information, such as by playing a prerecorded file stating "the following information is required to make the recording, please say your full name and press the '#' key when you are finished". Along with the caller's name, embodiments include the system asking for an NIP (e.g., such as a number identifying a person, personal identification number, or PIN), such as by playing a prerecorded file stating "please provide a four digit number to be your NIP and press the # key when you are finished". In response to the above prompts, the caller use voice or telephone keypad input to input the identity information requested. Embodiments include the system saving or storing the caller identity information (e.g., caller name and NIP) and the date in a computer database.

In addition, according to embodiments, the system evaluates a caller's identity information and NIP to determine or authenticate whether the identified person is authorized to record an interaction or conversation 314. For example, if the caller's name and NIP is not found in a database of authorized names and NIPs, the system can provide the person with an option to quit the system, select another application, or reenter the identity information. More particularly, the system may play a prerecorded file to the caller stating, for example, "the NIP is incorrect, please try again and press the # key when you are finished."

Furthermore, according to embodiments, the system may provide recording identification (ID) information for a recording to a caller. For instance, as shown in FIG. 3, the system provides the caller with a recording identification number 316, having a key number for identifying the file to be recorded into during the interaction. At this point, the system may play a prerecorded file stating "please write the next seven digit number down, this will be the identification number of your recorded conversation" and after a pause state "the identification number is . . . " and then play an audio file stating the number of the file to be recorded.

After providing recording identification information for the recording to the caller, according to embodiments, the system prompts the caller as to whether the caller wants to hear the legal terms of the interjurisdictional recording service. For example, the system could play an audio recording that states "to hear the legal terms of the service, press 1", and allow the caller to reply verbally or via the telephone keypad. Methods for providing the legal terms of the service include by playing a prerecorded audio file stating those terms and by providing the terms in text, for example, on a web site or as a computer file. After the terms are played, displayed, or transmitted, the system queries the recipient as to whether the terms were observed and understood. For instance, the system may play a prerecorded audio file that states "to agree that you have heard and understand the legal terms of the service, press 2."

According to embodiments, at least one target identifier corresponding to at least one call recipient is provided to the system. For example, the system prompts the caller using the IVR system to initiate a recording session and provide a relevant phone number or other target identifier number corresponding to a party or parties to be called. In response, the caller may provide a voice response or telephone keypad response to select call recipient(s) 318. More specifically, the system may play a prerecorded file stating "the system will start to record the conversation in a few seconds, make your third party call after the beep, the call will be recorded until the phone call ends."

According to embodiments, the caller authorizes the system to record an interaction including a telephone call between the caller, the system, and at least one call recipient. For example, the caller may authorize an interaction 320 where the authorizing includes implicit authorization and/or explicit authorization. Such explicit authorization includes by the caller providing input authorizing the system to record an interaction, such as by the caller providing a voice response or telephone keypad response to prompting for authorization by the system. To illustrate, the caller may respond to an IVR inquiry to "please press 1 to authorize a recording", may provide a target identifier (e.g., a telephone number) of at least one call recipient, may enter credit card or other account information, or may assent by voice or telephone keypad response to a system reminder that the caller's credit card or account will be charged as a result of continuing. Instances of implicit authorization include authorization as a result of the caller initiating a telephone call to the interjurisdictional receiving system (e.g., authorization is implied as a result of the caller using a system that is designed to record interactions over an interjurisdictional boundary) and ongoing authorization for a caller that has given a prior explicit authorization during the currently initiated call to the system.

After authorization is provided, a telephone call to at least one call recipient is initiated. According to embodiments, the system may initiate the telephone call to at least one call recipient. For example, in response to the target identifier corresponding to at least one call recipient provided, a digital processing system may initiate a telephone call by dialing a telephone number corresponding to a call recipient. Moreover, embodiments include the call or calls being initiated by the caller after interaction authorization by, for example, the caller dialing a third-party telephone calls through the system, such as to make a "conference" call to one or more third-party recipients.

After the call or calls to recipients is initiated, the system connecting a telephone call between the caller, the digital processing system, and the at least one call recipient 322. For example, according to an embodiment, the system plays a prerecorded file stating "the system will start to record the conversation in a few seconds, make your third-party call after the beep, the call will be recorded until the phone call ends." The system then plays a beep sound file, and starts recording a sound file of the three-way telephone interaction, wherein the name of the sound file is the recording identification number provided to the caller as described above with respect to 316. The caller then makes a third-party call to a call recipient and interacts in a voice communication with the recipient. The system saves the initial time of the conversation in a database and when the call ends, the system stops recording and saves the recording finalization time of the conversation in the database.

Consequently, the interaction, conversation, voices, and background sounds of the telephone call are recorded. For example, according to an embodiment as shown in FIG. 3, the system records the interaction and conversation 324, such as by recording the telephone call between a caller, the digital processing system, and at least one call recipient at the digital processing system. More particularly, embodiments include voice communications using voiceover IP from the first caller to the server, to a recipient, and back, with the entire conversation recorded on a suitable medium. Consequently, the system stores the recording 326, such an in a digital file.

Once a recording is made, that recording of the interaction or a copy thereof may be accessed by a caller or other system user. According to one embodiments, as shown in FIG. 3, the system (e.g., a computer or digital processing system) may provide access to a recording of an interaction when caller select application 308 is received with access/playback recording selected 340. The access/playback recording selected application allows a caller or user to gain access to or to have played back a selected recording by selecting one of a plurality of such recordings or by inputting a recording identification (ID) number. As shown in FIG. 3, a caller or user of the interjurisdictional recording system can provide a recording identification number input/selection 342 in order to select a recorded interaction (e.g., a digital recording of a conversation) to be played to that caller or user. For example, the system might prompt a person (e.g., caller or user) for a recording identification number by playing a prerecorded file stating "please dial the ID number of the recorded conversation and press the # key when you are finished", or by providing a person with a menu or selection of recordings from which to choose.

Further, according to embodiments, the system restricts access to the recording to those with appropriate authorization. For instance, access to the audio file created and maintained by the system or server (e.g., at 144) may be restricted to those with appropriate authorization (e.g., at 142). Thus, a caller or user can provide that person's identity information 344 to the system in order to authenticate whether the identified person is authorized to access a recording. For example, a caller or user may provide voice or telephone keypad input in response to a system recorded file asking that person to "please dial your NIP and press the # key when you finish." In addition, embodiments include caller and user input of their name, other relevant personal information, and other relevant recording identification information or codes in order to identify the person and/or a recording to be accessed (e.g., input in a method similar to that described above for the NIP).

In accordance with an embodiment, once recording and personal identity information are input, the system determines whether the identification information input is appropriate and/or whether the person attempting to gain access to the recording identified if authorized for such access. For instance, as shown in FIG. 3, the system may authenticate whether a recording ID number is appropriate by searching a list or database of recording ID numbers 346 to determine if the ID number input or selected at 342 exists in the list or database. If the ID number is not found, the system can provide the person with alternative methods of locating a recording or ask for reentry of the ID number. Specifically, the system may play a prerecorded file to a caller stating "the ID number is incorrect, please try again and press the # key when you are finished."

Similarly, embodiments include the system checking the caller or user's personal identity information and/or NIP to determine whether that person is authorized to access the interjurisdictional recording system or an identified recording to be accessed. For instance, the system may play a prerecorded file to a caller stating "the NIP is incorrect, please try again and press the # key when you are finished." Hence, as illustrated in FIG. 3, proper caller identity 348 can be performed, such as by matching the personal information and/or NIP given by a caller or user with a database of authorized callers/users and/or NIPs for a recording ID number (e.g., for a recording ID number previously input, for example, such as described above with regards to 342).

In accordance with embodiments, once a recording has been properly identified (e.g., by providing a proper recording ID number, caller identity, and NIP), the system authorizes the identified caller or user to access the identified recording. In the case illustrated in FIG. 3, this is shown at 350 where the system provides access/playback of the recording. More specifically, the system may use an IVR to play a prerecorded file stating "the conversation file will be played after the beep", play a beep sound file, and then play the recording of the telephone call or interaction corresponding to the recording ID number provided (e.g., at 342). Moreover, according to embodiments, access to a recording includes the ability or options to playback, modify, copy, delete, send a copy of, and e-mail a copy of the recording to an e-mail address.

Also, according to embodiments, once a recording is completed, it may be protected by the system from subsequent modification. For instance, a completed recording may be stored and protected from modification or deletion by a caller, call recipient, user, or other person or machine. In addition, according to embodiments, a completed recording may be modified by a caller, recipient, or user if that person provides valid personal identity information and that person is authorized to perform such modification. In such a manner, the system (e.g., such as a digital processing system or computer network server) may act as an "escrow agent" for a recording to which access is denied to the involved parties, thus denying those parties possession of that recording (e.g., access is denied to the caller and call recipients who are parties to the interaction recorded). As a result, the authenticity and accuracy of such a recording can more readily be established from a legal evidentiary standpoint.

By way of example, a caller may choose to conduct an interview using a cell phone with a recipient to create a digital file containing a recording of the interview. The extraterritorial nature of the caller's call over an interjurisdictional boundary to the system may implicate federal law and thus prevent the need for the caller to obtain the consent of the call recipient before recording the conversation. Furthermore, since the recording may be protected from subsequent modification, that recording may have legal value to certain entities or parties including those involved in law enforcement, insurance, contract negotiations, sale, and other endeavors where it is beneficial to create unalterable recordings of two-party interactions without the consent of one of the parties.

Another example of an implementation of the interjurisdictional recording system includes recording a telephone call over an interjurisdictional boundary between a caller and a digital processing system, without or without involving a call recipient. In this manner, for example, a caller can record a will via an interstate call, thus affording the caller (e.g., a testator) advantages of the jurisdiction where the recording system is located. For instance, embodiments of the invention include locating recording systems in one or more jurisdictions that permit holographic wills, oral wills, recorded audio wills, streamlined wills, wills into which addenda are incorporated, The Uniform Probate of Foreign Wills Act, Uniform Succession Without Administration Act, and/or any combination of thereof. Thus, a testator can make a will or statements of testamentary intent in a state other than that in which the testator is domiciled, to provide the testator with a valid will that is interpreted according to the laws of the jurisdiction where the recording system is located, while avoiding any disadvantages of the laws of the testator's jurisdiction.

More specifically, The Uniform Probate of Foreign Wills Act adopted by many states, contemplates that a testator can make a will in a jurisdiction other than the one in which he or she dies, and that such a will shall be deemed valid when probated in the state of domicile. For example, a caller can select a desired legal forum for drafting a will by making a call to an interjurisdictional recording system in a state that supports holographic wills to record a will that does not require that another party bear witness to the caller's recorded intent. Similarly, a caller can select a desired legal forum for drafting a will by making a call to an interjurisdictional recording system in a state that requires at least one witness confirm a recordation of testamentary intent, and then call at least one third party call recipient to connect a multi-party call and record the caller's intent along with the third party call recipient witness' confirmation of that intent. As compared to other states, the use of the system in this instance is a relatively less burdensome way for another party to bear witness to the caller's recorded intent.

For instance, an embodiment of the invention allows for the recording of an oral will by calling a 900 number that routes the call or includes a connection over an interjurisdictional boundary to a digital processing system. The system answers the call with an interactive voice response (IVR) routine. The IVR routine requests the caller to provide a NIP or personal identification number (PIN) which is used to identify the caller's will (e.g., such as by using the PIN as or to identify a "Will Number" for the recording). The IVR routine then requests the caller to provide background information, such as by inputting the caller's name, other relevant personal information, and/or other relevant background information. The caller provides the requested information, such as by inputting it in a method similar to that described above for the identity information at 344 and NIP at 314.

As to the recording itself, embodiments of the interjurisdictional recording system include recording an entire telephone call between the caller and the digital processing system or any portion of the telephone call. Thus, the system may record the entire phone call including the IVR routine's questions and caller answers (e.g., by recording from when the system answers the call to when the call is disconnected), or any portion of the call, with or without the IVR routine's questions and answers thereto.

Furthermore, embodiments of the interjurisdictional recording system include a caller authorizing (e.g., such as by explicit authorization and implicit authorization as explained above) the recording of portions of a telephone call between the caller and the digital processing system. As such, a caller may authorize a recording of portions of a telephone call including statements creating a will, a will addendum, or another component of a will. Specifically, the system may record the caller's statements of testamentary intent but not record IVR routine questions and caller answers thereto.

In the case where a will addendum or another portion or component of a will is recorded, the system can be located in a state that allows holographic wills and/or that liberally allows materials which are not of themselves of sufficient testamentary formality (e.g., which by themselves would not constitute a valid will) to be incorporated into a will by reference. In this situation, the caller then, per instructions from the IVR routine, can write a single sentence in his own handwriting, such as "This, my last will and testament, incorporates herein by reference my recorded statement, will number XXXX on file at 900-AAA-BBBB. Here will number "XXXX" can be a NIP or PIN number as described above and "900-AAA-BBBB" can be the 900 phone number of the system providing the IVR based will service.

The caller may then be asked a series of questions, and given certain instructions, and as a result, a recording is made. By way of illustration, the caller is asked to fold a sheet of blank paper in half, and write down on the left his loved ones, and on the right, the property he owns. The IVR routine then states, "For each person you whose name you have written down, describe the property you wish to will to them. If you wish to leave nothing, say nothing." The IVR routine then asks, "Do you wish to remember any charities? If so, name them and indicate to what extent you wish to leave something to them." As a result of this IVR routine, a series of statements from the caller is recorded in the caller's own words. The compilation of these recorded statements may then constitute the body of a holographic will. The compilation, may also constitute a permissible addendum incorporated by reference in jurisdictions in which the compilation itself may lack the requisite testamentary formality to be considered a valid will. Therefore, this implementation provides a convenient and quick way for a caller to make an instantaneous and inexpensive will because the will is generated orally during a telephone call via an interactive voice response routine and is valid upon recordation.

Embodiments of the system also offer the advantage of redundant copies of testator recordings to protect and facilitate access to the recordings. For instance, automatic distribution of copies to various computer server site repositories can facilitate the ability to retrieve a copy of the recording. Thus, centralization of testator recordings on various known computer servers can facilitate the distribution of assets and liabilities after the death of the decedent.

Also, automatic distribution of copies of a recording to computer server sites creates a more failsafe system by nature of the reliability of having redundant remote file system copies of the recordings. The remote and multiple archiving of the digital recording helps avoid the potential loss of all copies of a will or recording of a testators intents due to fires, floods, or human error. For instance, storage of multiple copies of a recorded will on numerous servers known as repositories of wills will reduce the likelihood of loosing a will, recording of intent, or location information of such a recording, such as by the probating attorney and/or client forgetting where the will or recording is located.

Additionally, embodiments of the interjurisdictional recording system can digitally record the testator's intent in the testator's own voice. Hence, in the event that the testamentary formalities of a particular state do not allow the probating of the oral recording as a will or component thereof, the intent of the testator may still be given weight by courts and/or by survivors of the testator. For instance, many states have adopted the Uniform Succession Without Administration Act (herein "the Act"), and other states have a functional equivalent. The purpose of the Act is to allow informal distribution of an estate with less than perfect testamentary formality by granting the statutory power to bypass probate so that summary administration of the estate is possible. Therefore in jurisdictions which have adopted the Act, the statutory power of an owner to leave property by his or her expressed intent, as memorialized in letters, sounds, or other symbols can allow the recorded oral disposition of the estate (e.g., even without the formalism of a holographic will incorporating the recorded instructions by reference). More particularly, the interjurisdictional nature of the system can provide a recording of intent, remote from the testator, so that the testator can invoke the act even if the testator's state of residence has not adopted the Act.

Moreover, the recorded oral disposition of the testator can be given great weight in any contested determination of the devolution of the estate. For instance, the recorded wishes of the testator may be given effect informally, or as evidence, by the decedent's thoughtful decision to invoke the Act. Also, the recording gives the survivors the opportunity to hear the actual oral words of the testator in the testator's own voice. As such, the true voice of the deceased testator may impact parties of interest, thus avoiding their contesting the recorded terms or otherwise contemplating disregarding the testator's recorded wishes.

Besides recording a testator's intent, embodiments of the interjurisdictional recording system are applicable to other legal aspects as well. For example, a recording of telephone call by a caller over an interjurisdictional boundary to a digital processing system can be used to afford the caller advantages provided by state laws of the state where the recording system is located or federal laws due to the interjurisdictional nature of the call. Such a call might afford the caller benefits of "forum shopping" for various state and/or federal laws including contract laws, family laws, corporate laws, corporate location benefits, evidentiary laws, jurisdictional laws, and jurisdictional presence.

In addition, affording the benefits of various state and/or federal laws may include recording an interjurisdictional telephone call between a caller and a digital processing system, with or without a connection to one or more call recipients. For example, a caller can select a desired legal forum for drafting a contract by making a call to an interjurisdictional recording system in the state that supports the contract law the caller desires. The system then calls a recipient to connect a three-way call and records a contract having terms spoken by and accepted by the caller and/or call recipient. More particularly, the caller could record the terms of the contract at the system and then use the system to call a recipient so that the system could play back a recording of the terms to the recipient as an offer to be accepted by the recipient. Terms of the contract can then be accepted in a second recording of a call over an interjurisdictional boundary including the caller, the system, the recipient, the playback, and the recipient's accept of the terms as or after those terms are played back.

Further, according to embodiment, recording, maintenance, and deletion may be provided automatically by the system, and/or manually by a system administrator. For example, the recordings may have a validity period, such as three months, after which they will be deleted. Such a validity period will help maintain the system and database containing the recordings and recording information, and may be mentioned in the legal terms of the service, as described above. Alternatively, according to embodiments, recordings may be permanently stored and available for posterior replay, no matter how old they are.

In addition to applications to record or access recordings, embodiments include caller options to select "other" interjurisdictional recording system applications. Moreover, depending on the "other" application that is selected, the system will prompt the caller for different options or information, such as by using an IVR, tone, as explained above. For example, as described above with respect to 308, the system IVR prompt to the caller may include " . . . dial or say 3 to send the recorded conversation to a previously provided e-mail address, dial or say 4 to hear the service terms and policies, dial or say 5 to contact the system owner, dial or say 6 for systems help, dial or say 0 to repeat the menu options." In response to that prompt, as shown in FIG. 3, the caller selects an "other" application 360 (e.g., other than record or access applications), such as by dialing or speaking a selection number. For example, a caller may dial or say "3" to select an application to send a recorded conversation to a previously provided e-mail address.

After selecting another application 360, embodiments include the system prompting the caller for input or to select required options as necessary for that other application 362. For example, where an application to send an e-mail of a recording, the system may require a caller to enter a recording ID number to select a computer file to be sent as an attachment to an e-mail. Next, once requirements for input, identification, and authorization are met, the system executes the other application 364. Hence, for the case where sending an e-mail is selected, the system can send a copy of a recording to an e-mail address.

Embodiments of the invention include sending recordings or copies of recordings by e-mail in various ways. To illustrate, a recording can be sent by transmitting the recording as computer file attachment to an e-mail or by copying the file into the text area of an e-mail, wherein the computer file may be in various formats including as a streaming media file (e.g., such as a .wav file), a text file (e.g., such as a .txt file), a HTML document, an executable file (e.g., such as a .exe or .bat file), a word processor file (e.g., such as a .doc or .wpd file), or as various other proper formats for sending audio data. Moreover, a recording can be sent by transmitting a link as an attachment to an e-mail or pasted into the text area or subject area. For example, a recording can be sent as an Internet hot-link or hyperlink to a resource having the recording as a file (e.g., such as formats described above), streaming media, code that causes data or media to be streamed (e.g., such a as an Internet hot-link or hyperlink to a site that provides streaming media audio playback of a requested recording), or as executable code providing additional secondary links to resources having the recording or one of the above.

According to embodiments, once an interjurisdictional recording system application is completed, the system will prompt the caller to determine if the caller is finished, such as by using an IVR or tone to ask whether the caller wants to end the call 366. In response, the caller may select to terminate the call 370, or may select another option, such as to return to the applications selection menu at 308. Also, according to embodiments, a caller may terminate a call, application, recording, or access to a recording by hanging up the telephone 370.

In addition, embodiments include users, accessing the system over a computer network, such as by using a client/server connection via the Internet, as described above with reference to FIG. 2. Moreover, according to embodiments, the system includes a web site, such as is shown by web site module 160. Specifically, for example, the system may include a web site having a domain name, a system for authenticating users, an access to legal terms and conditions of the recording service, interjurisdictional recording system owner company information, and multimedia playing programming capabilities. After entering the web site, the system may require a user to log in to continue (e.g., such as by using user's name, recording ID, and/or user NIP). Once a user is logged in, the system may allow the user to view information related to recordings such as the date of a recording, the beginning and end time of a recording, the valid dates of a stored recording file, the ANI of a recording call recipient. Besides these functions, the web site can allow an authorized user to e-mail an accessed recording to an e-mail address, such as by using prompting from and inputting to the web site commensurate with that described above for e-mailing a recording, with respect to other application 360-364. Embodiments also include prohibiting a user accessing a system web site from playing back or sending a recording from the system, such as via e-mail. Thus, the user is required to call the system to hear a playback of a recording or to send a copy of the recording outside the system, such as by e-mail.

Moreover, according to embodiments of the invention, the interjurisdictional recording system includes a database having a user table, an identification table, and a recording table as shown in Table I.

TABLE I

| Var Name | Type | Description |
|---|---|---|
| Table name: user | | |
| Id | String | The Id number of the rec. |
| Username | Audio (.wav file) | The user full name |
| Date | Date (mm/dd/yyyy) | The rec. date |
| Timebeg | Time (hh:mm:ss) | The rec. beginning time |
| Timeend | Time (hh:mm:ss) | The rec. end time |
| Validdate | Date (mm/dd/yyyy) | The rec. valid date (3 months) |
| Ani | String | The user phone number |
| Email | String | The user email |
| Table name: identification | | |
| Id | String | The Id number of the rec. (7 digit) |
| Nip | String | The user nip (4 digit) |
| Table name: recordings | | |
| Id | String | The Id number of the rec. |
| Idrecord | Audio (.wav file) | The recorded conversation |

As shown above, the user table provides information related to a caller or user, including the identification number of a recording, the caller/user's full name, the recording date, the recording beginning time, the recording end time, the date the recording is valid until, the caller/user's phone number, and the caller/user's email address. In addition, the identification table provides information for identifying a recording, including the ID number of the recording, and the caller/user NIP number associated with that recording. Finally, the recordings table provides information for accessing the recording as well as the actual file containing the recording or interaction, including the ID number of the recording and the actual recording of the interaction/conversation (e.g., such as a .wav file containing a digital recording of audio content).

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
    initiating a telephone call by a caller to a digital processing system;
    providing at least one target identifier corresponding to at least one call recipient;
    the caller selecting to record an interaction based on causing the recording to have legal value to the advantage of the caller or the call recipient, wherein the caller selecting comprises the caller providing one of an implicit authorization or an explicit authorization to record the interaction and to route the call over an interjurisdictional boundary, and wherein the interaction comprise the telephone call being made between the caller, the digital processing system, and the at least one call recipient, wherein the interjurisdictional boundary comprises one of a United States state border or an international border;
    recording the interaction;
    protecting the recording from being modified by one of the caller or the at least one call recipient;
    initiating a plurality of telephone calls by the caller to the digital processing system; and
    the caller selecting a subset of the plurality of calls to be recorded based on (1) causing the recordings of the subset to have legal value and (2) routing each call of the subset over an interjurisdictional boundary.

2. The method of claim 1 wherein the caller provides the target identifier; and
    further comprising:
    the caller providing caller identity information; and
    the caller receiving recording identification information for the recording.

3. The method of claim 1 wherein the interaction to be recorded is initiated by the caller.

4. The method of claim 1 further comprising accessing a recording of the interaction through one of a phone or a computer, wherein accessing comprises:
    providing personal identity information; and
    receiving authorization to access the recording of the interaction in accordance with the personal identity information.

5. The method of claim 1 further comprising:
    selecting one of a plurality of recordings of interactions; and
    playing back the selected recording.

6. The method of claim 1 wherein the legal value comprises the recording having an evidentiary value based on the protected recording having an authenticity value and/or an accuracy value.

7. The method of claim 1 wherein causing the telephone call to be routed over an interjurisdictional boundary comprises the caller selecting a legal forum where the digital processing system is located, the selection including an option to record in the same jurisdiction as that of the caller instead of in another jurisdiction; and wherein the legal value includes a contract term from a legal contract stating at least one legal intent of at least one of the caller and the call recipient and/or a term expressing testamentary intent.

8. A method comprising:
    receiving a telephone call from a caller at a digital processing system;
    obtaining at least one target identifier corresponding to at least one call recipient;
    obtaining a caller selection to record an interaction based on causing the recording to have legal value, wherein the caller selecting comprises the caller providing one of an implicit authorization or an explicit authorization to record the interaction and to route the call over an interjurisdictional boundary, and wherein the interaction comprises the telephone call being made between the caller, the digital processing system and the at least one call recipient, wherein the interjurisdictional boundary comprises one of a United States state border or an international border;
    recording the telephone call between the caller, the digital processing system, and the at least one call recipient;
    protecting the recording from being modified by one of the caller or the at least one call recipient;

receiving a plurality of telephone calls by the caller to the digital processing system; and receiving caller selections of a subset of the plurality of calls to be recorded based on (1) the caller selections causing recordings of the subset to have legal value and (2) routing each call of the subset over an interjurisdictional boundary.

9. The method of claim 8 further comprising prompting the caller for the at least one target identifier and for the caller selection, wherein prompting comprises using an interactive voice response (IVR) unit to communicate with the caller.

10. The method of claim 8 further comprising:

obtaining caller identity information;

determining whether there is an authorization for the caller to record; and providing recording identification information to the caller to identify the recording.

11. The method of claim 8 further comprising prompting the caller for the explicit authorization.

12. The method of claim 8 further comprising, as a result of obtaining the caller selection, the digital processing system initiating a telephone call to the at least one call recipient, wherein the initiating a telephone call to the at least one call recipient comprises connecting a telephone call between the caller, the digital processing system, and the at least one call recipient.

13. The method of claim 8 wherein the recording the telephone call comprises a recording at the digital processing system; and further comprising providing access to a recording of the interaction.

14. The method of claim 8 wherein the protecting the recording from being modified comprises the caller selecting to protect the recording, and allowing the recording to be modified if modification authorization exists for the caller.

15. The method of claim 8 further comprising:

obtaining personal identity information;

determining whether the identified person is authorized to access a recording; and providing the identified person with authorization to access the recording of the interaction in accordance with the personal identity information.

16. The method of claim 8, wherein routing the call implicates a Federal Law causing the recording to be a lawful recording without the consent of the call recipient; and wherein without the caller authorization to route the call over an interjurisdictional boundary, the recording would not have equal legal value.

17. The method of claim 8, wherein the recording provides the caller legal rights of a legal forum where the digital processing system is located; wherein the call is routed over the interjurisdictional boundary to the digital processing system; and wherein the legal value includes a contract term from a legal contract stating at least one legal intent of at least one of the caller or one call recipient.

* * * * *